United States Patent
Acee et al.

(10) Patent No.: US 11,414,184 B2
(45) Date of Patent: Aug. 16, 2022

(54) ELECTRIC DISTRIBUTED PROPULSION WITH DIFFERENT ROTOR ROTATIONAL SPEEDS

(71) Applicant: Bell Textron Inc., Fort Worth, TX (US)

(72) Inventors: Aaron Alexander Acee, Flower Mound, TX (US); Andrew Paul Haldeman, Fort Worth, TX (US); Eric Albert Sinusas, Southlake, TX (US); Yann Lavallee, St-Hippolyte (CA); Albert G. Brand, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 538 days.

(21) Appl. No.: 16/354,591

(22) Filed: Mar. 15, 2019

(65) Prior Publication Data

US 2020/0290735 A1 Sep. 17, 2020

(51) Int. Cl.
*B64C 27/82* (2006.01)
*B64D 31/00* (2006.01)
*H02P 5/46* (2006.01)

(52) U.S. Cl.
CPC .............. *B64C 27/82* (2013.01); *B64D 31/00* (2013.01); *H02P 5/46* (2013.01); *B64C 2027/8209* (2013.01); *B64C 2027/8227* (2013.01)

(58) Field of Classification Search
CPC ............ B64D 31/00; B64C 2027/8209; B64C 2027/8227
See application file for complete search history.

(56) References Cited

U.S. PATENT DOCUMENTS

| | | | | |
|---|---|---|---|---|
| 5,543,696 A | * | 8/1996 | Huggett | ............... H02P 6/06 318/590 |
| 7,443,132 B2 | | 10/2008 | Yoshihisa et al. | |
| 9,415,870 B1 | * | 8/2016 | Beckman | .............. B64C 39/024 |
| 9,489,937 B1 | * | 11/2016 | Beard | ................ G10L 21/0216 |
| 9,802,702 B1 | * | 10/2017 | Beckman | .............. B64C 39/024 |
| 10,843,807 B2 | * | 11/2020 | Bevirt | .................... B64C 11/20 |
| 2007/0024221 A1 | * | 2/2007 | Yoshihisa | ............... H02P 23/16 318/268 |
| 2008/0147252 A1 | * | 6/2008 | Bayer | ................... B64C 25/405 701/3 |

(Continued)

FOREIGN PATENT DOCUMENTS

| | | |
|---|---|---|
| EP | 3401216 A1 | 11/2018 |
| JP | 2003-175897 A | 6/2003 |
| JP | 2007124735 A * | 5/2007 |

*Primary Examiner* — Philip J Bonzell
*Assistant Examiner* — Michael B. Kreiner
(74) *Attorney, Agent, or Firm* — Shackelford, Bowen, McKinley & Norton, LLP

(57) ABSTRACT

An exemplary electric distributed propulsion system includes two or more rotors that are individually controlled by the rotational speed of associated motors, an input control connected to the associated motors to provide rotational speed control to the two or more rotors to produce a desired net thrust, and a logic connected to the input control and the associated motors, the logic for controlling speed and direction of the two or more rotors to achieve the desired net thrust and to avoid a motor speed condition.

9 Claims, 5 Drawing Sheets

(56) References Cited

U.S. PATENT DOCUMENTS

| | | | |
|---|---|---|---|
| 2016/0083073 A1* | 3/2016 | Beckman | G10K 11/17857 40/463 |
| 2017/0274981 A1* | 9/2017 | Shiosaki | B64C 11/20 |
| 2017/0349273 A1 | 12/2017 | Parsons et al. | |
| 2017/0349274 A1 | 12/2017 | Fenny et al. | |
| 2017/0349276 A1 | 12/2017 | Fenny | |
| 2018/0186448 A1* | 7/2018 | Pantalone | B64C 39/024 |
| 2019/0185149 A1* | 6/2019 | Pantalone | G05D 19/02 |
| 2019/0237059 A1* | 8/2019 | Cantrell | G10K 11/17823 |
| 2020/0073410 A1* | 3/2020 | Tillotson | G08G 5/045 |
| 2020/0385112 A1* | 12/2020 | Brunetti | B64C 27/12 |

\* cited by examiner

ELECTRIC DISTRIBUTED PROPULSION WITH DIFFERENT ROTOR ROTATIONAL SPEEDS

TECHNICAL FIELD

This disclosure relates in general to the field of aircraft, and more particularly, to flight control.

BACKGROUND

This section provides background information to facilitate a better understanding of the various aspects of the disclosure. It should be understood that the statements in this section of this document are to be read in this light, and not as admissions of prior art.

Without limiting the scope of this disclosure, the background is described in connection with anti-torque systems. Counter-torque tail rotors are often used in helicopters and are generally mounted adjacent to vertical fins that provide for aircraft stability. In such a configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise. To address these issues, the vertical fin can be replaced by an annular airfoil (sometimes called a duct or shroud) having a diameter greater than the diameter of the tail rotor and which can be mounted around the tail rotor.

SUMMARY

An exemplary electric distributed propulsion system includes two or more motors controlled by speed, an input control connected to the two or more motors to provide control to the two or more motors to produce a desired net thrust, and a logic connected to the input control and the two or more motors, the logic for controlling the two or more motors with different rotational speeds to achieve the desired net thrust and to avoid a motor speed condition.

An exemplary helicopter includes a main rotor, an anti-torque system comprising a plurality of rotors that are individually controlled by motor speed of associated motors, an input control connected to the associated motors to provide control to the plurality of rotors to produce a desired net thrust, and a logic connected to the input control and the associated motors, the logic for controlling rotational speed of the plurality of rotors to achieve the desired net thrust and to avoid a motor speed condition.

A method of operating an electric distributed propulsion system includes providing pilot input to operating the electric distributed propulsion system to produce a desired thrust, the electric distributed propulsion system comprising a plurality of rotors controlled by motor speed of an associated plurality of motors and controlling rotational speed and direction of the plurality of rotors to achieve the desired thrust and to avoid a motor speed condition.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
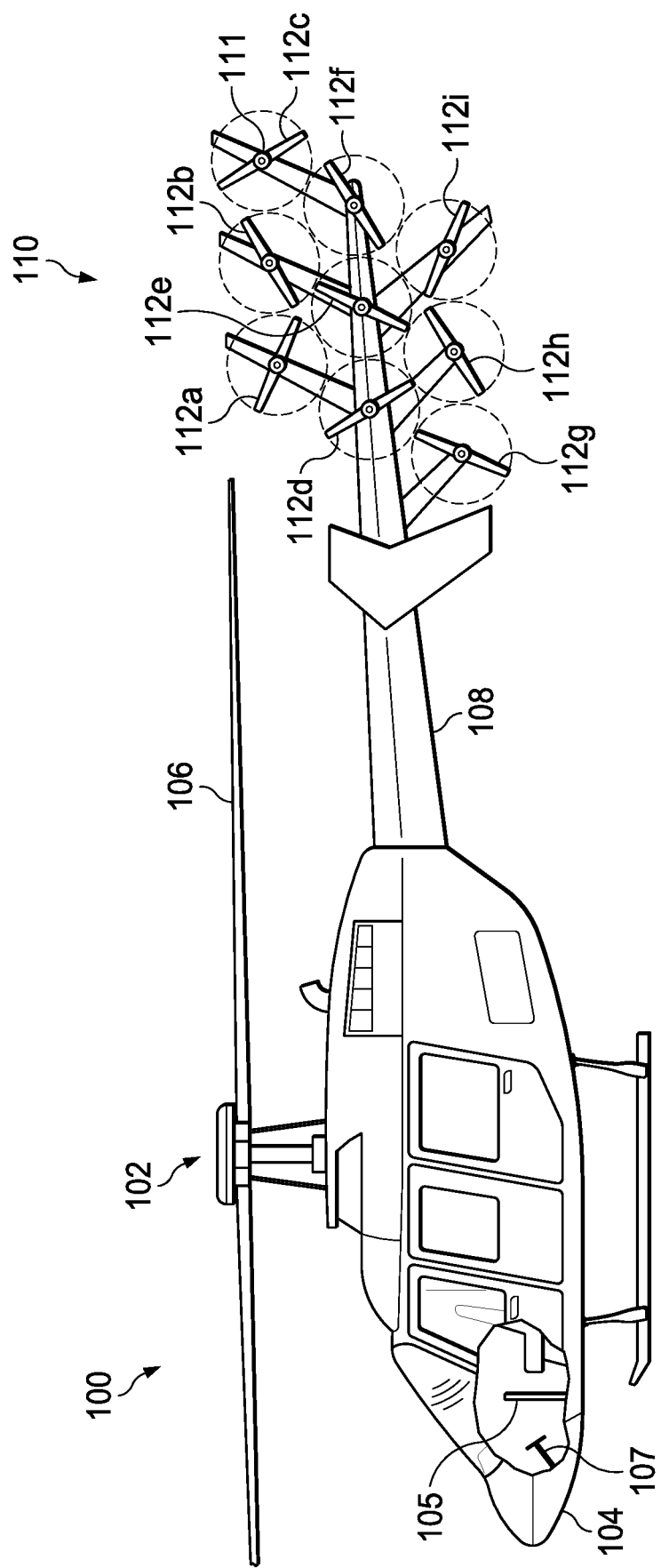
FIG. 1 illustrates an exemplary aircraft with an exemplary electric distributed anti-torque system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 illustrates an exemplary rotary aircraft 100, shown as a helicopter, having a distributed propulsion matrix 110 with a plurality of rotors 112, i.e., fans, each directly driven by an electric motor 111. In this example, distributed propulsion matrix 110 is implemented as an anti-torque matrix 110 and includes nine rotors 112a-112i. Rotors 112a-112i may be fixed pitch rotors. Electric, AC synchronous motors 111 directly drive rotors 112. Helicopter 100 includes a rotary system 102 carried by a fuselage 104. Rotor blades 106 connected to rotary system 102 provide flight for helicopter 100. Rotor blades 106 are controlled by multiple controllers within the fuselage 104. For example, during flight, a pilot can manipulate controllers 105, 107 for changing a pitch angle of rotor blades 106 and to provide vertical, horizontal and yaw flight control. Helicopter 100 has a tail boom 108, which supports anti-torque matrix 110 at the aft end. Each of rotors 112a-112i can be operated individually or in groups to provide counter-torque force for transversely stabilizing the helicopter 100. As further described herein, synchronous motors 111, directly driving rotors 112, can be operated individually or in groups at different speeds and in different directions, i.e., positive and negative speed, to provide the required thrust and to avoid or mitigate motor speed dead bands, to avoid yaw authority discontinuity at low fan RPM, and/or resonant frequency conditions between the fans and the aircraft structure, and/or to mitigate tonal frequencies in the acoustic signature of the anti-torque matrix 110.

The physical configuration and arrangement of the distributed propulsion matrix and the number of rotors can vary. Examples of anti-torque distributed propulsion matrixes are disclosed in U.S. Publication 2017/0349276, the teachings of which are fully incorporated herein. Although the distributed propulsion system is described herein with reference to an anti-torque system, it is understood that the system and control can be implemented in other distributed propulsion systems and in manned and unmanned rotary aircraft.

Teachings of certain embodiments recognize that rotors 112 may represent one example of a rotor or anti-torque rotor; other examples include, but are not limited to, tail propellers, ducted tail rotors, and ducted fans mounted inside and/or outside the aircraft. Teachings of certain embodiments relating to rotors and rotor systems may apply to rotor systems, such as distributed rotors, tiltrotor, tilt-wing, and helicopter rotor systems. It should be appreciated that teachings herein apply to manned and unmanned vehicles and aircraft including without limitation airplanes, rotorcraft, hovercraft, helicopters, and rotary-wing vehicles.

Figure 2:
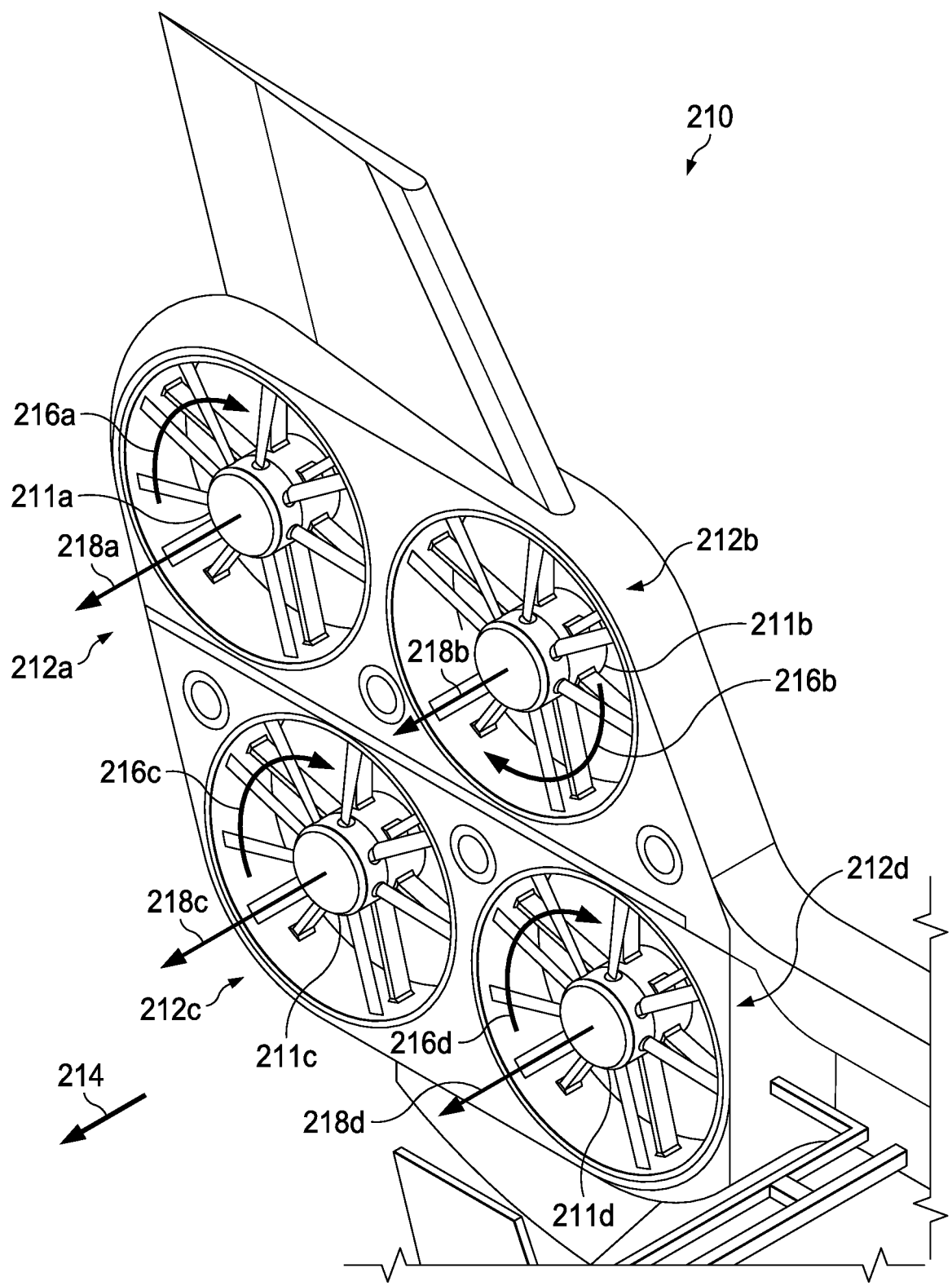
FIG. 2 illustrates an exemplary electric distributed anti-torque system according to one or more aspects of the disclosure.

FIG. 2 illustrates another exemplary anti-torque matrix 210 having four shrouded rotors generally denoted with the numeral 212 and individually designated 212a-212d. In FIG. 2, rotors 212a-212d are fixed pitch rotors electrically driven, directly by AC synchronous motors 211a-211d. In operation, a pilot can control the thrust of anti-torque matrix 210, for example, through operation of pilot controls, e.g., pedals 107 (FIG. 1). Through operation of the controls, the rotational speed and direction of rotation of rotors 212a-212d can be manipulated to produce the desired level of thrust. In an embodiment, a flight control computer, e.g. logic, can change the speed of the one or more variable speed motors 211a-211d to alter the thrust or anti-torque to achieve a desired aircraft yaw rate in response to the pilot's control inputs, which can include positive, negative, or zero yaw rate.

FIG. 2 illustrates anti-torque matrix 210 being operated to produce a net thrust 214. Individual fixed pitch rotors 212a-212d are operated at individual rotational speeds 216a-216d to produce individual thrusts 218a-218d resulting in a net anti-torque matrix thrust 214. When producing a high thrust 214 the individual motors 211a-211d are operated at a rotational speed that is a high percentage of the maximum rated speed (RPM) of synchronous motor 211a-211d. As the desired level of thrust 214 decreases, the speed of each of the motors 212a-212d is decreased.

Figure 3:
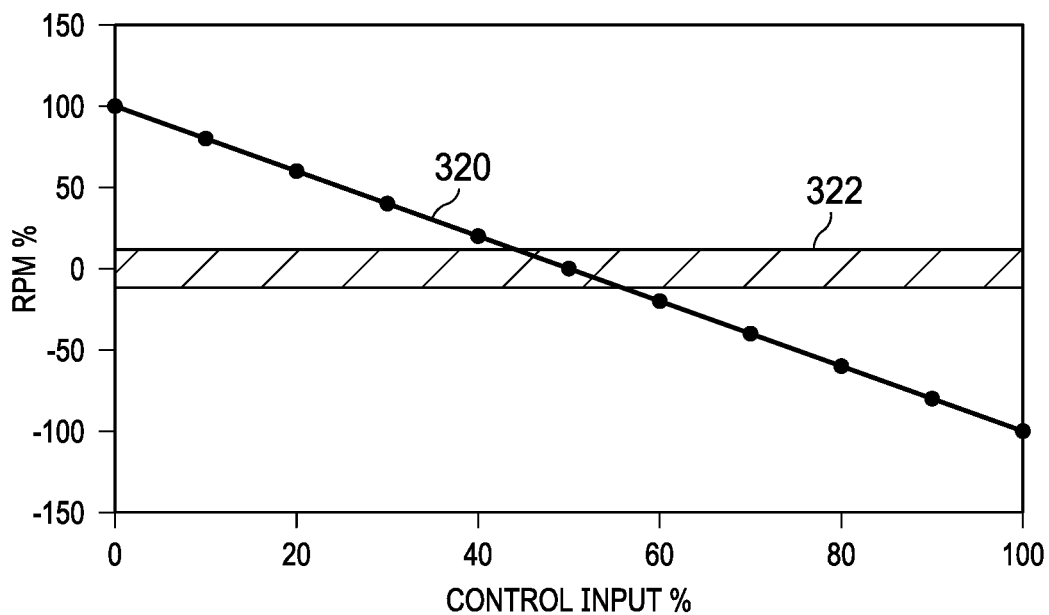
FIG. 3 is a graphic illustration of an electric distributed propulsion system operating in a motor rotational speed dead band.

Due to the architecture of AC synchronous motors controlled by speed, the motors have difficulty producing low rotational speeds, even though low thrust may be demanded by the pilot. For example, in FIG. 3, a band 322 of poor RPM control exists between about plus and minus 7-percent of the maximum rated rotational speed. This band 322 is referred to as a speed or RPM dead band on the motor. FIG. 3 graphically illustrates the rotational speed 320 (e.g., speed-control curve) of rotors 212a-212d (i.e., the fans) versus the control input percentage, e.g., pedals 107 in FIG. 1. Operating fan motors 211a-211d in the speed dead band 322 creates ambiguous anti-torque yaw control authority, reducing the ability to hold a precise heading.

Figure 5:
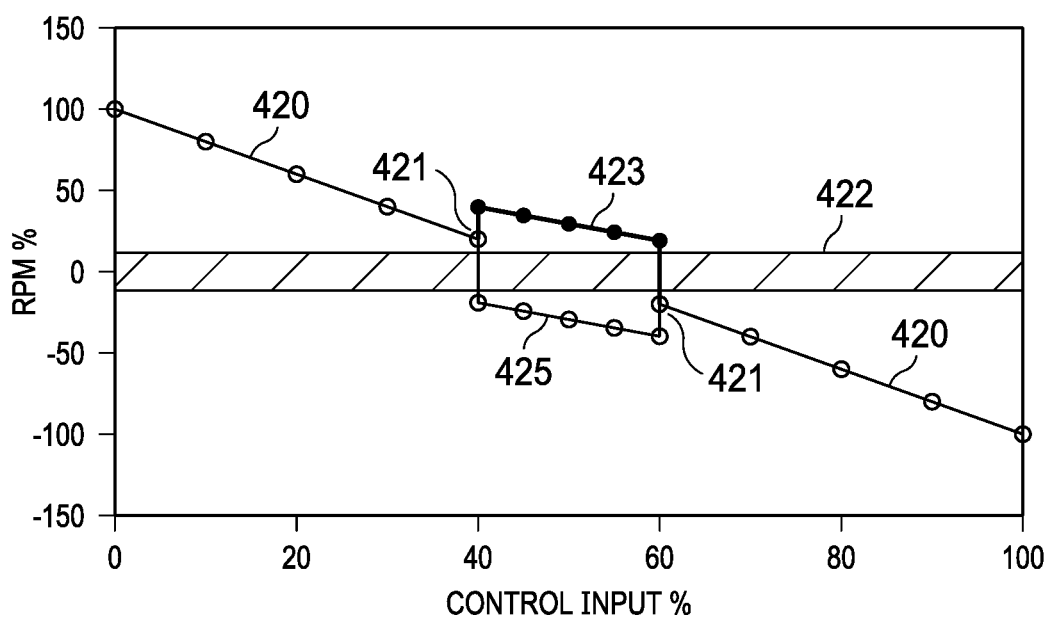
FIG. 5 is a graphic illustration of an electric distributed propulsion system operating motors at different speeds to avoid operating in a speed dead band according to one or more aspects of the disclosure.
Figure 4:
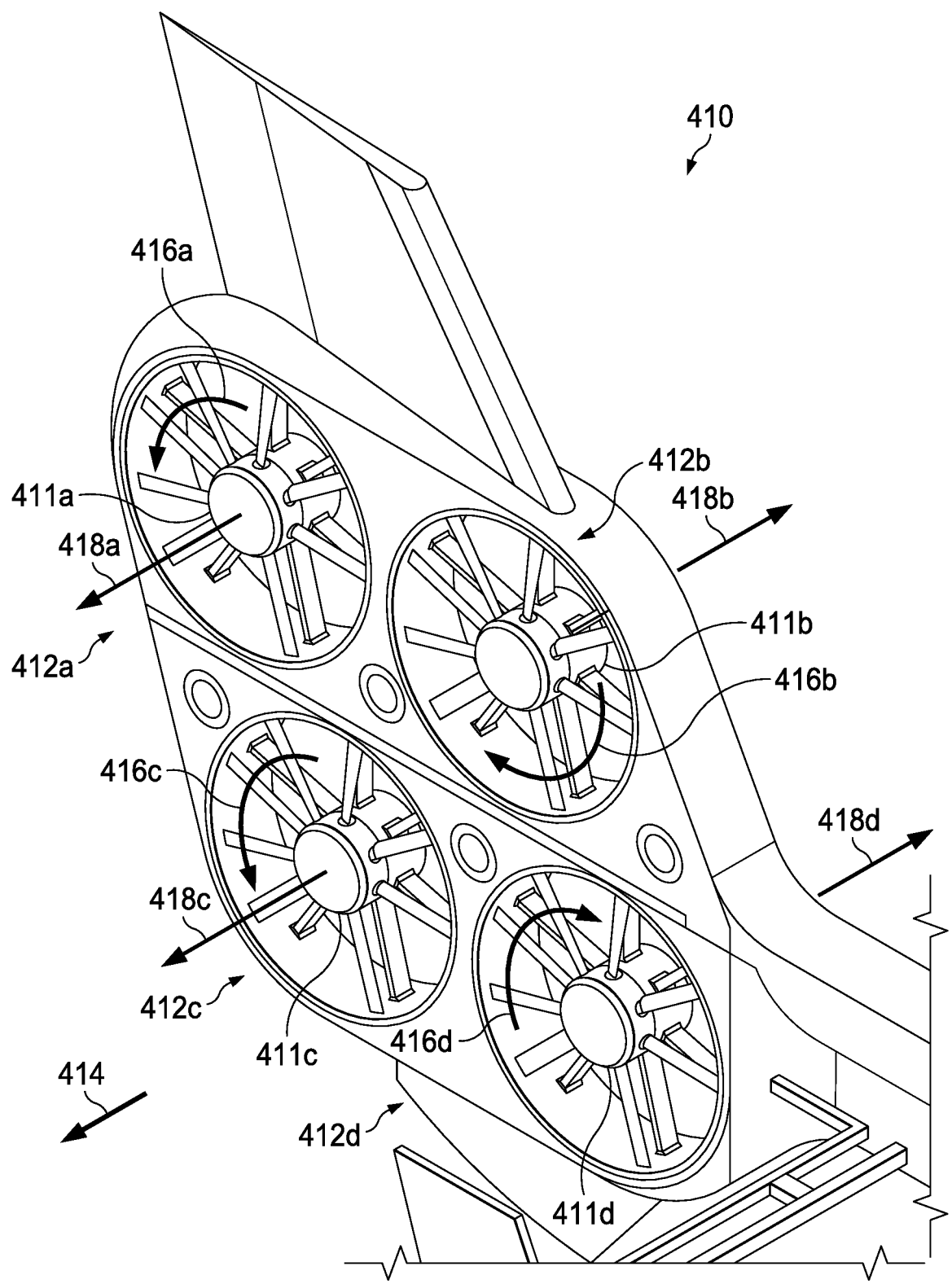
FIG. 4 illustrates another exemplary anti-torque matrix according to one or more aspects of the disclosure.

FIGS. 4 and 5 illustrate an exemplary method of operating anti-torque fans 412a-412d via motors 411a-411d at different speeds 416a-416d to produce a desired net thrust 414 and prevent any of the fans 412a-412d from operating in the speed dead band 422. For example, FIG. 5 illustrates anti-torque matrix 410 of FIG. 4 being operated such that fan motors 411a-411d are paired into two sets, where a set will operate at the same RPM. Outside of the dead band 422, all motors operate along speed-control curve 420. As motor speed 416 approaches speed dead band 422, e.g., at trigger speed 421, one set of motors 411a, 411c operates along speed control curve 423 (positive rotational speeds 416a, 416c) that is outside of speed dead band 422 and the other set of motors 411b, 411d operates along speed-control curve 425 (negative rotational speeds 416b, 416d) that is outside of speed dead band 422 to keep all the individual motor speeds 416a-416d outside of the speed dead band and develop an accurate net thrust 414 and ensure that proper heading control is maintained for all control positions. In this example, trigger speed 421 is about plus or minus 10-percent of the maximum rated speed.

For example, in FIG. 5, when the motor speeds approach the speed dead band in response to a control input for achieving a desired net thrust 414, e.g., at trigger speed 421, rotors 412a, 412c are operated in a first direction 416a, 416c (positive rotational speed) at a speed outside of the speed dead band to produce individual thrusts 418a, 418c and rotors 412b, 412d are operated in a second direction 416b, 416d (negative rotational speed) at a speed outside of the speed dead band to produce individual thrusts 418b, 418d. The individual thrusts 418a-418d produce the desired net thrust 414 while preventing any motor in the anti-torque matrix from operating within the speed dead band. Although FIG. 5 illustrates the fans being operated in opposite directions to produce the desired net thrust 414, other modes of fan operation may be used. For example, one or more of the motors can be operated at a rotational speed outside of the speed dead band and one or more of the other motors can be operated at a zero rotational speed. In another example, some or all of the motors may be operated at different rotational speeds but not necessarily in opposite directions. For example, in a four fan matrix all four motors may be rotated at different rotational speeds from one another but in the same direction to create the desired net thrust or the combination of motors may be operated at the same and/or different rotational speeds. The curves in FIG. 5 may also take on different patterns to avoid different RPM bands (such as structural resonances) and need not be linear. In an embodiment, none of the motors is operated within the structural resonance speed band. Accordingly, as the pilot provides a control input, e.g. via controls 107, a flight computer can adjust the rotational speed of the individual motors and rotors to achieve the desired thrust and maintain the speed of the anti-torque matrix outside the structural resonance speed band.

Figure 6:
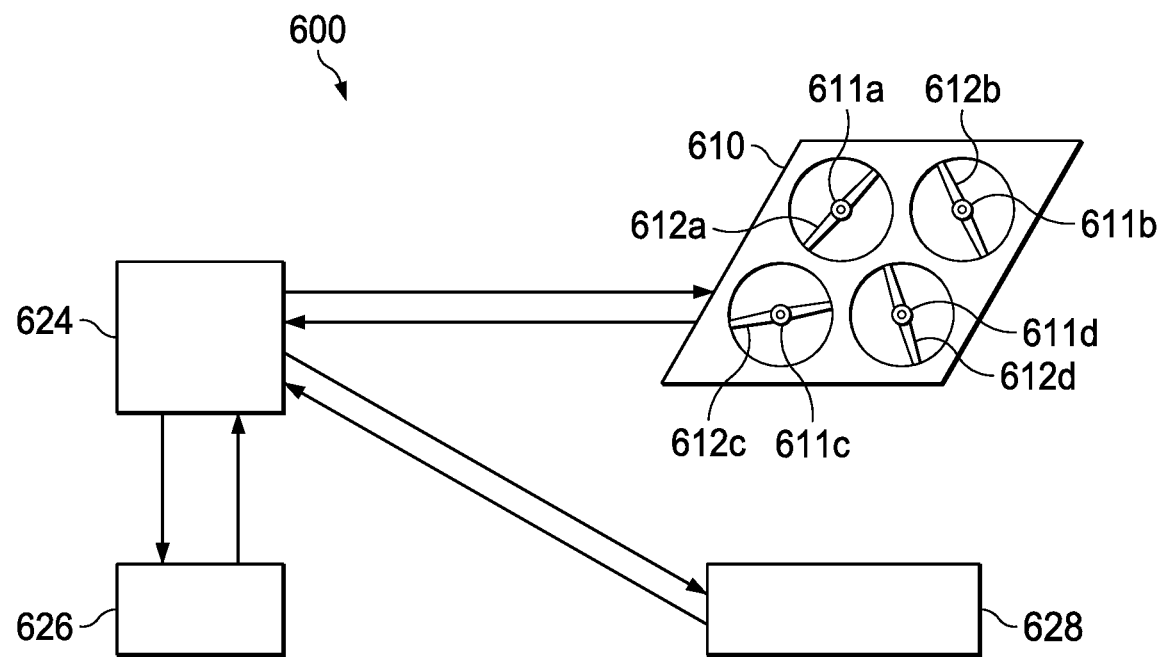
FIG. 6 illustrates an exemplary control system for use with an electric distributed propulsion with different speeds according to one or more aspects of the disclosure.

FIG. 6 illustrates an exemplary control system 600 for use with a distributed propulsion matrix 610 having a plurality of rotors 612a-612d each driven by a speed controlled electric motor 611a-611d. A control logic 624 is connected to a pilot input control 626. Control logic 624 is connected to motors 611 and controls the speed of rotors 612. Control logic 624 is also connected to a table 628 that includes, for example, speed versus thrust for each of the motors 611. Control logic 624 looks up the speed and thrust for the motors to adjust the speed and direction of the motors based on the pilot input to achieve a desired distributed propulsion matrix thrust and maintain the speed of the motors of the distributed propulsion matrix outside of the speed dead band during flight operations.

Figure 7:
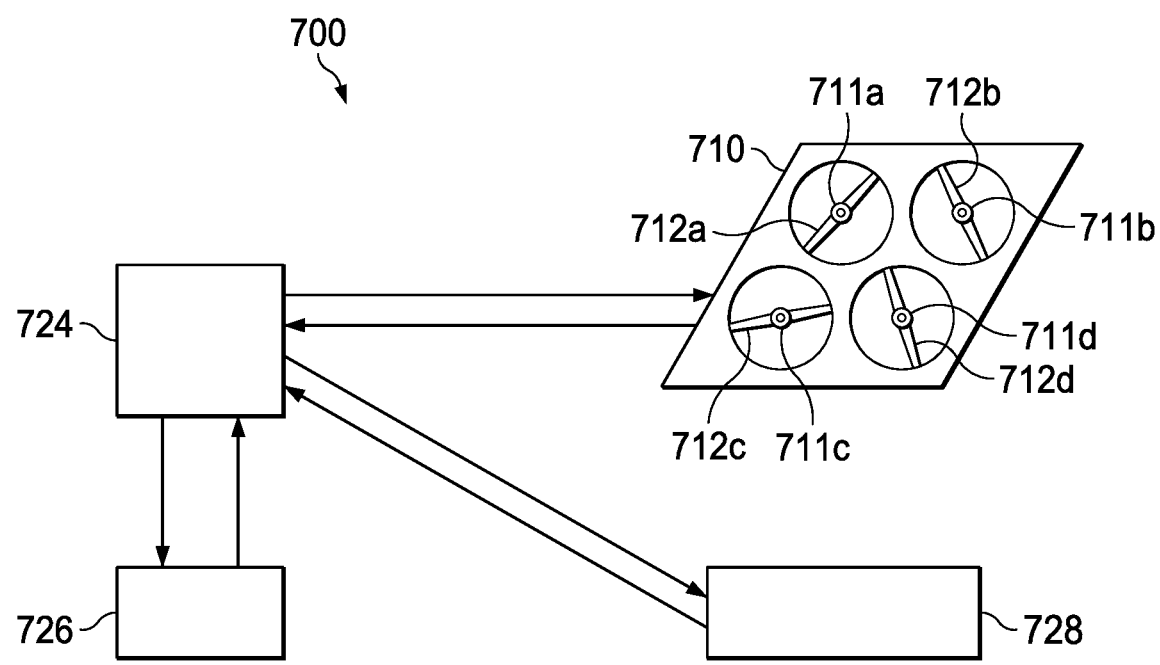
FIG. 7 illustrates another exemplary control system for use with an electric distributed propulsion with different speeds according to one or more aspects of the disclosure.

FIG. 7 illustrates another exemplary control system 700 for use with a distributed propulsion matrix 710 having a plurality of rotors 712a-712d individually driven by speed controlled electric motors 711a-711d. In this exemplary control system, rotors 712a-712d may be operated at different speeds to avoid operating at a frequency that amplifies a resonant frequency of the aircraft 100 (FIG. 1) structure. A control logic 724 is connected to a pilot input control 726. Control logic 724 is connected to motors 711 and controls the speed of rotors 712. Control logic 724 is also connected to a table 728 that includes for example rotational speed versus pilot control position for each of the rotors 712. Control logic 724 looks up the pilot control position and determines the associated speed for the motors to achieve a desired net thrust while operating the individual rotors at frequencies different from the aircraft structural resonant frequency. For example, for a given desired thrust, motors 711a, 711c may be operated at a higher speed than the resonant frequency related speed and motors 711b, 711d may be operated at lower speed than the resonant frequency related speed. Thus, the motors are operated outside of a speed band related to a resonant frequency of the aircraft.

An exemplary electric distributed propulsion system includes two or more rotors that are controlled by motors via rotational speed, the two or more rotors producing a desired net thrust, the logic for controlling motor speed and direction of the two or more rotors to achieve a desired net thrust and to avoid a particular range of motor speed conditions.

An exemplary helicopter includes a main rotor, an anti-torque system comprising a plurality of rotors controlled by the rotational speed of an associated plurality of drive motors, an input control connected to the plurality of motors to provide control to the plurality of rotors to produce a desired thrust, and a logic connected to the input control of the plurality of motors, the logic for controlling speed and direction of the plurality of rotors to achieve the desired net thrust and to avoid a particular range of motor speed conditions.

An exemplary method of operating an electric distributed propulsion system includes providing pilot input to the electric distributed propulsion system to produce a desired thrust, the electric distributed propulsion system including a plurality of fixed pitch rotors controlled by rotational speed of a plurality of associated rotor drive motors and controlling rotational speed and direction of the plurality of fixed pitch rotors to achieve the desired net thrust and to avoid a particular range of motor speed conditions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An electric distributed propulsion system, the system comprising:
   a plurality of motors controlled by speed, wherein the plurality of motors comprise a first pair of motors and a second pair of motors;
   an input control connected to the plurality of motors to provide control to the plurality of motors to produce a desired net thrust;
   a logic connected to the input control and the plurality of motors, the logic for controlling the plurality of motors with different rotational speeds to achieve the desired net thrust and to avoid a motor speed condition by operating the first pair of motors in a first direction and operating the second pair of motors in a second direction;

wherein the electric distributed propulsion system is an anti-torque system in a helicopter;
wherein the motor speed condition comprises at least one of:
a speed dead band of the plurality of motors;
separating a tonal frequency of each of the plurality of motors by varying the rotational speed of each of the plurality of motor's speed to achieve a preferred overall acoustic signature;
a resonant frequency of the plurality of motors; and
a resonant frequency of a structure connected to the plurality of motors.

2. The system of claim 1, wherein none of the plurality of motors is operated at a motor speed within the speed dead band.

3. The system of claim 1, wherein one or more of the plurality of motors is operated at a first rotational speed that is different from the motor speed condition and another one or more of the plurality of rotors is operated at a second rotational speed that is different from the motor speed condition.

4. A helicopter, the helicopter comprising:
a main rotor;
an anti-torque system comprising a plurality of rotors that are individually controlled by motor speed of associated motors, wherein the plurality of rotors comprise a first pair of rotors and a second pair of rotors;
an input control connected to the associated motors to provide control to the plurality of rotors to produce a desired net thrust; and
a logic connected to the input control and the associated motors, the logic for controlling rotational speed of the plurality of rotors to achieve the desired net thrust and to avoid a motor speed condition by operating the first pair of rotors in a first direction and operating the second pair of rotors in a second direction;
wherein the motor speed condition comprises at least one of:
a speed dead band of the associated motors;
separating a tonal frequency of each of the plurality of rotors by varying the rotational speed to achieve a preferred overall acoustic signature;
a resonant frequency associated with the plurality of rotors; and
a resonant frequency of a structure connected to the plurality of rotors.

5. The helicopter of claim 4, wherein none of the plurality of rotors is operated at a motor speed within the speed dead band.

6. The helicopter of claim 4, wherein one or more of the plurality of rotors is operated at a first rotational speed that is different from the motor speed condition and another one or more of the plurality of rotors is operated at a second rotational speed that is different from the motor speed condition.

7. A helicopter comprising:
a main rotor;
an anti-torque system comprising a plurality of rotors that are individually controlled by motor speed of associated motors, wherein the plurality of rotors comprise a first pair of rotors and a second pair of rotors;
an input control connected to the associated motors to provide control to the plurality of rotors to produce a desired net thrust;
a logic connected to the input control and the associated motors, the logic for controlling rotational speed of the plurality of rotors to achieve the desired net thrust and to avoid a motor speed condition by operating the first pair of rotors in a first direction and operating the second pair of rotors in a second direction; and
wherein the motor speed condition comprises a speed dead band of the associated motors.

8. The helicopter of claim 7, wherein none of the plurality of rotors is operated at a motor speed within the speed dead band.

9. The helicopter of claim 7, wherein one or more of the plurality of rotors is operated at a first rotational speed that is different from the motor speed condition and another one or more of the plurality of rotors is operated at a second rotational speed that is different from the motor speed condition.

* * * * *